United States Patent
Harada et al.

[11] Patent Number: 5,955,180
[45] Date of Patent: *Sep. 21, 1999

[54] MULTI-LAYER FILM

[75] Inventors: Masahiro Harada; Makoto Takahashi; Katsuya Maruyama; Katsuyuki Murai, all of Kanagawa-ken, Japan

[73] Assignee: Mitsubishi Gas Chemical Company, Inc., Tokyo, Japan

[*] Notice: This patent is subject to a terminal disclaimer.

[21] Appl. No.: 08/956,911

[22] Filed: Oct. 23, 1997

Related U.S. Application Data

[63] Continuation-in-part of application No. 08/725,563, Oct. 3, 1996, abandoned.

[30] Foreign Application Priority Data

Oct. 26, 1995 [JP] Japan ................................ 7-278963

[51] Int. Cl.$^6$ ................................ B32B 27/34
[52] U.S. Cl. .................... 428/212; 428/213; 428/214; 428/220; 428/474.4; 428/474.7; 428/474.9; 428/475.5; 428/475.8; 428/476.3; 428/910
[58] Field of Search ................ 428/220, 212, 428/213, 214, 474.4, 474.7, 474.8, 475.5, 910, 475.8, 476.3

[56] References Cited

U.S. PATENT DOCUMENTS

| | | | |
|---|---|---|---|
| 4,908,272 | 3/1990 | Harada et al. | 428/412 |
| 5,106,693 | 4/1992 | Harada et al. | 428/412 |
| 5,268,219 | 12/1993 | Harada et al. | 428/220 |
| 5,356,676 | 10/1994 | von Widdern et al. | 428/34.8 |

FOREIGN PATENT DOCUMENTS

| | | |
|---|---|---|
| 0 288 972 | 11/1988 | European Pat. Off. . |
| 0 530 539 | 3/1993 | European Pat. Off. . |
| 0 530 549 | 3/1993 | European Pat. Off. . |
| 53-119984 | 10/1978 | Japan . |

OTHER PUBLICATIONS

Database WPI, Section Ch, Week 7916, Derwent Publications Ltd., London, GB; Class A94 of JP 54 031 489 A (Toyobo KK), Mar. 8, 1979.
Database WPI, Section Ch., Week 7404, Derwent Publications Ltd., London, GB; Class A92 of JP 48 064 165 A (Toyobo Co. Ltd.), Sep. 5, 1973.
Patent Abstracts of Japan, vol. 95, No. 010 of JP 07 256836 A (Dainippon Printing Co., Ltd.), Oct. 9, 1995.
Patent Abstracts of Japan, vol. 95, No. 010 of JP 07 256843 A (Sumitomo Bakelite Co., Ltd.), Oct. 9, 1995.

*Primary Examiner*—Leszek Kiliman
*Attorney, Agent, or Firm*—Frishauf, Holtz, Goodman, Langer & Chick, P.C.

[57] ABSTRACT

The invention relates to a multi-layer film comprising a layer (A) made of a polyamide (a), a layer (B) made of a mixed polyamide ($b_3$) of a polyamide ($b_1$) and an aliphatic polyamide ($b_2$), a layer (C) made of an adhesive polyolefin ($c_1$) or a mixed resin ($c_3$) of an adhesive polyolefin ($c_1$) and a polyolefin ($c_2$), and a layer (D) made of a polyolefin (d), wherein the layer constitution is such that the layers are arranged in order of the layer (A)/the layer (B)/the layer (C)/the layer (D), and the layer (B) is made of a mixed polyamide ($b_3$) made up of 60 to 95% by weight of a polyamide ($b_1$) obtained from a diamine comprising 70 mol % or more of meta-xylylenediamine and a dicarboxyic acid comprising 70 mol % or more of an $\alpha,\omega$-aliphatic dicarboxylic acid having 6 to 12 carbon atoms and 40 to 5% by weight of an aliphatic polyamide ($b_2$) having a semi-crystallization time of 30 sec or less at 160° C. and a solubility parameter (SP value) of 13±1.5.

5 Claims, No Drawings

MULTI-LAYER FILM

CROSS-REFERENCE TO RELATED APPLICATIONS

This application is a continuation-in-part application of Ser. No. 08/725,563 filed on Oct. 3, 1996, now abandoned, the entire contents of which are hereby incorporated herein by reference.

BACKGROUND OF THE INVENTION

1. Field of the Invention

The present invention relates to a gas barrier multi-layer film excellent in impact resistance and transparency as a packaging material for food, chemicals, electronic parts, etc.

2. Description of the Related Arts

Since polyamides obtained by polycondensation reaction of xylylenediamine with aliphatic dicarboxylic acids, such as a polyamide obtained from meta-xylylenediamine and adipic acid (hereinafter sometimes referred to as "MX nylon"), exhibit a low permeability to gaseous substances, such as oxygen and carbon dioxide, in recent years, they are used for bottles and oriented films as a gas barrier material.

However, generally the impact resistance is unsatisfactory if only a barrier layer made of the above barrier material is used. Therefore, practically, as a means for improving the impact resistance, a multi-layer film made up of (1) a polyamide layer made of MX nylon or a blend material of MX nylon and an aliphatic polyamide and (2) an adhesive layer made of a modified polyolefin is disclosed in Japanese Patent Application Laid-Open No. 119984/1978. However, the above polyamide layer made up of MX nylon or a blend material of MX nylon and an aliphatic polyamide has a problem that generally when the polyamide layer is heat-treated, it is hard to retain the good transparency.

Thus, an unorientated film of MX nylon itself is easily blushed and loses the transparency when it is subjected to sterilization by heating or absorbs water or moisture. Therefore, with the intention of keeping the transparency of the film, U.S. Pat. No. 4,908,272 discloses a barrier laminate wherein use is made of a barrier layer made of a non-crystalline polyamide whose diamine component is meta-xylylenediamine. However, such a non-crystalline polyamide is special, expensive, and so on and therefore is difficultly available, and the film obtained therefrom is rigid and so on and therefore has not been put to practical use.

Japanese Patent Application Laid-Open No. 120168/1992 and U.S. Pat. No. 5,268,219 disclose a technique wherein MX nylon and an aliphatic polyamide, such as nylon 6, are blended under specific conditions to obtain an unorientated film good in transparency. However, it is hard to say that when a blend of MX nylon with nylon 6 is used for an unorientated film, it has a satisfactory impact resistance. Thus, for example, on account of its low impact strength an unorientated multi-layer film obtained by the co-extrusion of a blend material of MX nylon with nylon 6 and a polyolefin has not yet been employed widely in the field of packaging except for special applications.

Namely, a gas barrier multi-layer film having satisfactorily both impact resistance and transparency after heat treatment is not known.

SUMMARY OF THE INVENTION

An object of the present invention is to provide a film excellent in impact resistance and gas barrier properties as well as transparency after sterilization by heating as a packaging material for food, chemicals, electronic parts, etc. by solving the above problems.

As a result of intensive investigations, the present inventors have found that a gas barrier multi-layer film that has a high impact strength not hitherto been attained by any conventional unorientated films obtained by using MX nylon and also possesses a transparency can be obtained by arranging, as an outer layer, a layer of a polyamide 6 or a copolymerized polyamide having a polyamide 6 as the major component and a polyamide blend layer containing MX nylon excellent in gas barrier properties adjacent to said outer layer. The present invention has been completed based on this finding.

Specifically, the present invention provides a multi-layer film comprising a layer (A) made of a polyamide (a), a layer (B) made of a mixed polyamide ($b_3$) of a polyamide ($b_1$) and an aliphatic polyamide ($b_2$), a layer (C) made of an adhesive polyolefin ($c_1$) or a mixed resin ($c_3$) of an adhesive polyolefin ($c_1$) and a polyolefin ($c_2$), and a layer (D) made of a polyolefin (d), wherein (1) the layer constitution is such that the layers are arranged in order of the layer (A)/the layer (B)/the layer (C)/the layer (D), (2) the polyamide (a) contains 70 to 100 mol % of structural units represented by the following formula (1):

$$\mathrm{\{NH\!-\!(CH_2)_5\!-\!CO\}}\tag{1}$$

(3) the layer (B) is made of a mixed polyamide ($b_3$) made up of 60 to 95% by weight of a polyamide ($b_1$) obtained from a diamine comprising 70 mol % or more of meta-xylylenediamine and a dicarboxyic acid comprising 70 mol % or more of an α,ω-aliphatic dicarboxylic acid having 6 to 12 carbon atoms and 40 to 5% by weight of an aliphatic polyamide ($b_2$) having a semi-crystallization time of 30 sec or less at 160° C. and a solubility parameter (SP value) of 13 ±1.5, (4) said mixed polyamide ($b_3$) satisfies the following relationship:

$$(0.025C-2.2) \leq \log R \leq (0.025C-0.5) \tag{2}$$

wherein C represents the proportion (% by weight) of the polyamide ($b_1$) in the mixed polyamide ($b_3$) with the proportion in the range of 60 to 95% by weight and R represents a ratio $\eta(b_1)/\eta(b_2)$ in which $\eta(b_1)$ and $\eta(b_2)$ denote the melt viscosity of the polyamide ($b_1$) and the melt viscosity of the polyamide ($b_2$), respectively, at a temperature at least 20° C. higher than the higher melting point of the melting points of the polyamide ($b_1$) and the aliphatic polyamide ($b_2$), and (5) the thickness of the layer (A) is 5 to 80 μm, the thickness of the layer (B) is 5 to 50 μm, and the overall thickness of the multi-layer film is 15 μm or more.

DESCRIPTION OF THE PREFERRED EMBODIMENTS

In the present invention, by "polyamide (a)" is meant a polyamide 6 or a copolymerized polyamide having a polyamide 6 as the major component. Herein, the polyamide having a polyamide 6 as the major component comprises a polyamide component having at least 70 mol % of recurring units of the above formula (1) derived from ε-caprolactam or ω-aminocapric acid and, as the other polyamide component, a polyamide component derived from an aliphatic diamine having 4 to 12 carbon atoms and an aliphatic dicarboxylic acid having 4 to 12 carbon atoms or an aromatic dicarboxylic acid or a mixed dicarboxylic acid thereof, a polyamide component derived from a lactam other than ε-caprolactam, and/or the like.

Specific examples of the polyamide (a) are nylon 6, nylon 666 copolymers, copolymerized polyamides of ε-caprolactam with hexamethylenediamine, adipic acid, and isophthalic acid, copolymerized polyamides of ε-caprolactam with hexamethylenediamine, adipic acid, terephthalic acid, and isophthalic acid, copolymerized polyamides of ε-caprolactam with hexamethylenediamine, adipic acid, and terephthalic acid, and copolymerized polyamides of ε-caprolactam with hexamethylenediamine, terephthalic acid, and isophthalic acid.

Where the amount of the structural units represented by the formula (1) in the polyamide (a) is less than 70 mol % based on all the constitutional components, there arise such problems as a decrease in the crystallization speed of the polyamide, a decrease in the film formability, an increase in the dependency of the physical properties on humidity, a decrease in the resistance to water and chemicals, and a loss of the impact resistance inherent in the polyamide.

In the present invention, the layer (B) is a layer made of a mixed polyamide ($b_3$) of 60 to 95% by weight of a polyamide ($b_1$) obtained from a diamine comprising 70 mol % or more of meta-xylylenediamine and a dicarboxylic acid comprising 70 mol % or more of an α,ω-aliphatic dicarboxylic acid having 6 to 12 carbon atoms and 40 to 5% by weight of an aliphatic polyamide ($b_2$).

Specifically, examples of the polyamide ($b_1$) are a polyamide obtained from meta-xylylenediamine and adipic acid (hereinafter sometimes referred to as "nylon MXD6" or "N-MXD6"), a copolymerized polyamide obtained from a mixed diamine of meta-xylylenediamine with para-xylylenediamine and adipic acid, a polyamide obtained from meta-xylylenediamine and sebacic acid, a polyamide obtained from meta-xylylenediamine, adipic acid, and isophthalic acid, and a polyamide obtained from meta-xylylenediamine, adipic acid, terephthalic acid, and isophthalic acid.

With respect to the polyamide ($b_1$), if the amount of the meta-xylylenediamine in the diamine component is less than 70 mol %, since there arise such problems that the crystallizability of the polyamide is lowered to lower the barrier ability against gaseous substances and the dependency of physical properties on moisture is increased, the suitability as a film material is lowered. Further, if the amount of the α,ω-aliphatic dicarboxylic acid having 6 to 12 carbon atoms in the dicarboxylic acid component to be used in the polyamide ($b_1$) is less than 70 mol %, for example, if the amount of the aromatic dicarboxylic acid exceeds 30 mol %, in some cases, the resulting polyamide involves disadvantages such as a decrease in the impact resistance and a decrease in the flowability during extrusion molding.

As the polyamide that constitutes the layer (B) of the present invention, a mixed polyamide ($b_3$) comprising 60 to 95% by weight of a polyamide ($b_1$) and 40 to 5% by weight of an aliphatic polyamide ($b_2$) is used. Herein, the proportion of the polyamide ($b_1$) in the mixed polyamide ($b_3$) is 60 to 95% by weight, and preferably 70 to 95% by weight and the proportion of the aliphatic polyamide ($b_2$) is 40 to 5% by weight, and preferably 30 to 5% by weight. If the proportion of the polyamide ($b_1$) in the mixed polyamide ($b_3$) is less than 60% by weight, the barrier ability of the layer (B) against gaseous substances is lowered, which unsuitably degrades one of the features of the multi-layer as a packaging material.

By "aliphatic polyamide ($b_2$)" is meant a polyamide having as the major structure a polyamide obtained from an aliphatic diamine and an aliphatic dicarboxylic acid and having a semicrystallization time of 30 sec or less at 160° C. and an SP value in the range of 13±1.5. As specific examples of such a polyamide, nylon 6, nylon 66, nylon 666, nylon 46, and nylon 612 can be mentioned.

The polyamide ($b_2$) acts as a nucleating agent for crystallization of the polyamide ($b_1$) when the polyamide ($b_1$) and the polyamide ($b_2$) are melted and kneaded and then are formed into a film. As a result, the polyamide ($b_1$) does not form large spherulites. If the semicrystallization time of the polyamide ($b_2$) at 160° C. is over 30 sec, the polyamide ($b_2$) does not act as a nucleating agent for crystallization of the polyamide ($b_1$) when the polyamide ($b_1$) and the polyamide ($b_2$) are melted and kneaded and then are formed into a film. As a result, the polyamide ($b_1$) forms large spherulites and therefore it is impossible to obtain a film having a good transparency.

In the case of absence of a nucleating agent for crystallization, the polyamide ($b_1$) in the present invention is apt to form large spherulites when it absorbs water or moisture or it is heated to the glass transition temperature or over to crystallize after formed into a film. The large spherulites cause dispersion of light thereby increasing the haze to impair the transparency of the film. According to the present invention, a multi-layer film having a haze value of 20 or less, and preferably 15 or less, measured in accordance with ASTM D1003 can be produced.

The semicrystallization time of the polyamide ($b_2$) may be not only the semicrystallization time of the polyamide ($b_2$) itself but also the semicrystallization time of the polyamide ($b_2$) containing a nucleating agent for crystallization. That is to say, if a polyamide has a semicrystallization time of over 30 sec, when the semicrystallization time is brought to 30 sec or less by adding a nucleating agent for crystallization, then the polyamide can be used as the polyamide ($b_2$) in the present invention. In the present invention, preferably the semicrystallization time of the polyamide ($b_2$) is 20 sec or less.

The SP value of the polyamide ($b_2$) used in the present invention is in the range of 13±1.5. Herein, the SP value refers to the Small's constant set forth in Table on page 97 of "The Technology of Plasticizers" (1982) written by J. Kern Sears and Joseph R. Darby. If the SP value of the polyamide ($b_2$) is outside the range of 13±1.5, the haze of the composition itself formed by mixing the polyamide ($b_2$) with the polyamide ($b_1$) is increased and therefore a transparent film cannot be obtained.

In the present invention, specific examples of the SP values of polyamides that can be used as the polyamide ($b_2$) are the following:

Nylon 6: 12.7
Nylon 66: 12.7
Nylon 46: 13.4
Nylon 610: 11.7
Nylon 612: 11.5

Further, the mixed polyamide ($b_3$) is required to satisfy the following relationship (2):

$$(0.025C-2.2) \leq \log R \leq (0.025C-0.5) \quad (2)$$

wherein C represents the proportion (% by weight) of the polyamide ($b_1$) in the mixed polyamide ($b_3$) with the proportion in the range of 60 to 95% by weight and R represents a ratio $\eta(b_1)/\eta(b_2)$ in which $\eta(b_1)$ and $\eta(b_2)$ denote the melt viscosity of the polyamide ($b_1$) and the melt viscosity of the polyamide ($b_2$), respectively, at a temperature at least 20° C. higher than the higher melting point of the melting points of the polyamide ($b_1$) and the aliphatic polyamide ($b_2$).

If the value of the above R is smaller than the lower limit of the relationship (2), the melt viscosity of the polyamide ($b_2$) becomes too higher than the melt viscosity of the polyamide ($b_1$), they are apt to be mixed unsatisfactorily, and therefore it becomes impossible to provide a film having an excellent transparency which is one of the objects of the present invention. It seems that this is because the melt viscosity of the polyamide ($b_2$) is too high to allow the polyamide ($b_2$) to disperse in the polyamide ($b_1$) and as a result the effect of the polyamide ($b_2$) cannot be exhibited as a nucleating agent satisfactorily. On the other hand, if the value of R is larger than upper limit of the relationship (2), the melt viscosity of the polyamide ($b_2$) becomes too lower than the melt viscosity of the polyamide ($b_1$), the fluidity of the mixed polyamide becomes unstable and as a result it becomes difficult to produce a film stably.

The adhesive polyolefin layer (C) is a layer made of an adhesive polyolefin ($c_1$) or a mixed resin ($c_3$) of an adhesive polyolefin ($c_1$) and a polyolefin ($c_2$). As the adhesive polyolefin ($c_1$), can be used a polymer prepared from an olefin as the main monomer or its modification product. There are no particular restrictions on the adhesive polyolefin ($c_1$) so long as it is a thermoplastic polymer capable of adhesion both to polyamides and polyolefins. For example, use can be made of a polyethylene and polypropylene modified with maleic acid or maleic anhydride, a polyolefin copolymer modified, for example, with an acrylic type monomer or vinyl acetate, and a product which is obtained by modifying these polyolefin copolymer modification products with maleic acid or maleic anhydride.

For the adhesive polyolefin layer (C), a mixed resin ($c_3$) can be used. Herein, the mixed resin ($c_3$) is a mixed resin of the above adhesive polyolefin ($c_1$) with the above polyolefin ($c_2$).

As the polyolefin ($c_2$), can be mentioned, for example, an olefin polymer of ethylene, propylene, butene, or the like and a copolymer of olefins. As the polyolefin (d) constituting the layer (D), can be mentioned an olefin polymer of ethylene, propylene, butene, or the like and a copolymer of olefins.

The layer (E) is a layer made of an adhesive polyolefin ($e_1$) or a mixed resin ($e_3$) of said adhesive polyolefin ($e_1$) and a polyolefin ($e_2$).

As the adhesive polyolefin ($e_1$), can be used a polymer prepared from an olefin as the main monomer and its modification product. There are no particular restrictions on the adhesive polyolefin ($e_1$) so long as it is a thermoplastic polymer capable of adhesion both to polyamides and polyolefins and for example use can be made of a polyethylene and polypropylene modified with maleic acid or maleic anhydride, a polyolefin copolymer modified, for example, with an acrylic type monomer or vinyl acetate, and a product which is obtained by modifying these polyolefin copolymer modification products with maleic acid or maleic anhydride.

As the polyolefin ($e_2$), can be mentioned, for example, an olefin polymer of ethylene, propylene, butene, or the like and a copolymer of olefins.

The layer structure of the multi-layer film of the present invention has multiple layers preferably arranged in order of (A)/(B)/(C)/(D) or (A)/(B)/(E).

The above structure can provide a multi-layer film that can prevent the layers from being delaminated from one another and is excellent in impact strength, gas barrier properties, heat-sealing strength, and moisture barrier effect.

The thickness of the layer (A) of the multi-layer film of the present invention is 5 to 80 $\mu$m, and preferably 8 to 60 $\mu$m. If the thickness of the layer (A) is less than 5 $\mu$m, the multi-layer film cannot exhibit satisfactory impact strength unfavorably. On the other hand, if the thickness of the layer (A) exceeds 80 $\mu$m, there arise inappropriately such problems as a decrease in the flexibility of the film, an increase in the proportion of the thickness of the polyamide layer and hence marked changes in physical properties of the overall film due to the water absorption thereof, and a decrease in the thermoformability.

The thickness of the layer (B) is 5 to 50 $\mu$m, and preferably 8 to 40 $\mu$m. If the thickness of the layer (B) is less than 5 $\mu$m, satisfactory gas barrier properties cannot be secured unsuitably. On the other hand, if the thickness of the layer (B) exceeds 50 $\mu$m, the proportion of the polyamide (B) low in impact strength is increased in the film to make it difficult to retain the impact strength of the film at a high level, which is not suitable.

The thickness of the layer (C) is not particularly restricted so long as it is enough to secure the adhesion between the layer (B) or the inner layer (A) and the layer (D), and the thickness of the layer (C) is generally 1 to 40 $\mu$m, and preferably 5 to 30 $\mu$m. Further, the thickness of the layer (D) can be arbitrarily set by taking the heat-sealing properties and the moisture barrier effect into account. The thickness of the layer (D) is generally 1 to 240 $\mu$m, preferably 5 to 240 $\mu$m, and more preferably 10 to 150 $\mu$m, but there are no problems if the thickness of the layer (C) is set to be over 240 $\mu$m.

The particulars relating to the thickness of the above layer (D) can apply to the thickness of the layer (E) as well.

The overall thickness of the multi-layer film of the present invention is 15 $\mu$m or more, preferably 20 $\mu$m or more, more preferably 20 to 250 $\mu$m, and particularly preferably 30 to 200 $\mu$m. If the thickness of the film is less than 15 mm, the thickness of each layer cannot be secured satisfactorily and therefore the film functions, i.e., certain levels of the impact resistance, the gas barrier properties, the interlayer adhesion, the heat-sealing properties, and the like as will be exhibited by the presence of the layer (A), the layer (B), the layer (C), and the layer (D) or the presence of the layer (A), the layer (B), and the layer (E) cannot be exhibited, which is unsuitable.

The multi-layer film having the layer structure of the present invention can be produced by the co-extrusion method or the extrusion coating method. The adoption of the co-extrusion method and the extrusion coating method will distinctly develop the effect of enhancing the impact resistance according to the present invention. However, the adoption of other lamination method will not eliminate the effect of the present invention and the lamination method, such as dry lamination, can be used as a method of producing the multi-layer film having the layer structure of the present invention. The co-extrusion is a method wherein a plurality of melted resins in layered states are joined within or outside dies of extruders to form a film or a sheet and includes the method called tandem lamination.

By "co-extrusion coating method" is meant a method wherein a single-layer film or a multi-layer film in a melted state is laminated onto one surface or both surfaces of a previously formed film or sheet by the extrusion, co-extrusion, or tandem lamination method.

According to the present invention, it becomes possible to obtain a multi-layer film excellent in impact strength, gas barrier properties, and transparency after sterilization by heating from MX nylon and the obtainable multi-layer film is expected to be used widely as a packaging material, wherein impact resistance and gas barrier properties are required, for food, medicines, electronic components, ink, paint, adhesives, etc.

Hereinbelow, the present invention will be more specifically described with reference to Examples and Comparative Examples, wherein the physical properties and the like are evaluated according to the following methods:

(1) Melt Viscosity

The melt viscosity was measured with a capillary rheometer (flow tester CFT-50, supplied by Shimazu Corporation).

Capillary dimensions: diameter: 1 mm φ, length: 10 mm; and pressure: 10 kg/cm².

(2) Semicrystallization Time

The semicrystallization time was measured according to the depolarized light intensity method with a crystallization rate measuring apparatus (MK-701, supplied by Kotaki Seisakusho) under the following conditions:

Temperature for melting the sample: temperature 15° C. higher than the melting point.

Time for melting the sample: 3 min

Temperature of a crystallizing bath: 160° C.

(3) Solubility Parameter (SP)

The solubility parameter was calculated from the following equation, on the basis of the Small's constant described on "The Technology of Plasticizers", page 97 (written by J. Kern Sears and Joseph R. Darby and issued in 1982).

SP=ΣF/V

F: Small's molar-attraction constant

V: Molar volume ($cm^3$/mol)

(4) Impact Resistance (Impact Strength)

The impact resistance was measured in accordance with ASTM D781.

A puncture tester (PMI puncture tester manufactured by Toyo Seiki Co., Ltd.) was used and the measuring conditions were such that the temperature was 23° C. and the relative humidity was 50%.

(5) Oxygen Permeability

The oxygen permeability was measured in accordance with ASTM D3985.

OXTRAN 10/50A manufactured by Modern Controls Co., Ltd. was used and the measuring conditions were such that the temperature was 23° C. and the relative humidity was 60%.

(6) Transparency after Boiling

The transparency after boiling was measured in accordance with ASTM D1003.

A color-difference meter (Σ-Z 80, supplied by Nippon Denshoku Kogyo K.K.) was used and after the film was immersed in boiling water for 30 min, the haze was measured.

EXAMPLE 1

Nylon 6 (used for the construction of a layer A, manufactured by Ube Industries, Inc. under the trade name of Ube Nylon 1030B, and hereinafter sometimes referred to as N-6), a blend (used for the construction of a layer B) of nylon MXD6 (manufactured by Mitsubishi Gas Chemical Co., Inc. under the trade name of MX nylon 6007) with N-6 (manufactured by Ube Industries, Inc. under the trade name of Ube Nylon 1024B and having a semicrystallization time of 14 sec) with the blending weight ratio of N-MXD6/N-6 being 80/20 and the melt viscosity ratio R being 0.8, an adhesive polyethylene (used for the construction of a layer C and manufactured by Mitsui Petrochemical Industries, Ltd. under the trade name of ADMER NF300), and a straight-chain low-density polyethylene (used for the construction of a layer D and manufactured by Mitsui Petrochemical Industries, Ltd. under the trade name of Ultzex 2022L) were extruded from an extruder having a cylinder diameter of 40 mm, an extruder having a cylinder diameter of 30 mm, an extruder having a cylinder diameter of 40 mm, and an extruder having a cylinder diameter of 45 mm, respectively, to bring them into a multi-layer melted state through a feed block so that the order of the arrangement of the layers might be (A)/(B)/(C)/(D) and they were formed into a multi-layer film by the T-die/cooling roll method (co-extrusion method). The structure of the layers and the results of the evaluation of the thicknesses of the layers, the impact strength, the oxygen permeability, and the transparency of the thus formed multi-layer film are shown in Table 1.

COMPARATIVE EXAMPLE 1

A straight-chain low-density polyethylene (manufactured by Mitsui Petrochemical Industries, Ltd. under the trade name of Ultzex 2022L and hereinafter referred to as LLDPE sometimes), an adhesive polyethylene (manufactured by Mitsui Petrochemical Industries, Ltd. under the trade name of ADMER NF300), and a blend of N-MXD6 (manufactured by Mitsubishi Gas Chemical Co., Inc. under the trade name of MX nylon 6007) with N-6 (manufactured by Ube Industries, Inc. under the trade name of Ube Nylon 1030B and having a semicrystallization time of 14 sec) with the blending weight ratio of N-MXD6/N-6 being 80/20 and the melt viscosity ratio R being 0.8 were co-extruded from an extruder having a cylinder diameter of 45 mm, an extruder having a cylinder diameter of 30 mm, and an extruder having a diameter of 30 mm, respectively, to bring them into a multi-layer melted state through a feed block and they were formed into a multi-layer film by the T-die/cooling roll method (co-extrusion method) with the intermediate layer being made of the blend of N-MXD6 with N-6 and the layer of the adhesive polyethylene being in contact with the layer of the blend. The thicknesses of the layers thus formed were such that the LLDPE/adhesive layer/blend layer/adhesive layer/LLDPE were 25/10/20/10/25 (μm) and the overall thickness was 90 μm. The impact strength and the oxygen permeability of the obtained film were unsatisfactorily 26 kg-cm and 8.0 cc/m2-day-atm, respectively.

EXAMPLES 2 to 8 AND COMPARATIVE EXAMPLES 2 to 6

Using the same apparatus as used in Example 1, multi-layer films were made in the same manner as in Example 1, with the differences that the structures of the layers, the blending weight ratios of N-MXD6 with N-6, and the thicknesses of the layers were as shown in Table 1. The impact strength and the oxygen permeability of each of them were measured. The results are shown in Table 1.

(manufactured by Ube Industries, Inc. under the trade name of Ube Nylon 1011FB and having a semicrystallization time of 14 sec) with the blending weight ratio of N-MXD6/N-6 being 80/20 and the melt viscosity ratio R being 44.2, an adhesive polyethylene (used for the construction of a layer C and manufactured by Mitsui Petrochemical Industries, Ltd. under the trade name of ADMER NF300), and a straight-chain low-density polyethylene (used for the construction of a layer D and manufactured by Mitsui Petrochemical Industries, Ltd. under the trade name of Ultzex 2022L) were extruded from an extruder having a cylinder diameter of 40 mm, an extruder having a cylinder diameter of 30 mm, an extruder having a cylinder diameter of 40 mm,

TABLE 1

| | Example | | | | | | | |
|---|---|---|---|---|---|---|---|---|
| | 1 | 2 | 3 | 4 | 5 | 6 | 7 | 8 |
| (1) Multi-layer film | | | | | | | | |
| Blending weight ratio in layer B: N-MXD6/N-6 | 80/20 | 80/20 | 80/20 | 70/30 | 90/10 | 80/20 | 80/20 | 95/5 |
| Melt viscosity ratio R | 0.8 | 0.8 | 0.8 | 0.8 | 1.7 | 0.8 | 0.8 | 1G.2 |
| log R | −0.1 | −0.1 | −0.1 | −0.1 | 0.2 | −0.1 | −0.1 | 1.0 |
| (measured temp. for R in °C.) | (260) | (260) | (260) | (260) | (260) | (260) | (260) | (260) |
| log R | | | | | | | | |
| Upper limit | 1.5 | 1.5 | 1.5 | 1.3 | 1.8 | 1.5 | 1.5 | 1.9 |
| Lower limit | −0.2 | −0.2 | −0.2 | −0.5 | 0.1 | −0.2 | −0.2 | 0.2 |
| Thicknesses of layers (μm) | | | | | | | | |
| Layer A/layer B | 10/9 | 10/40 | 8/16 | 10/17 | 60/10 | 20/20 | 20/20 | 20/10 |
| Thicknesses of layers (μm) | | | | | | | | |
| Layer C/layer D | 10/53 | 10/40 | 10/45 | 10/60 | 10/80 | 20/140 | 10/30 | 10/45 |
| Overall thickness (μm) | 81 | 100 | 79 | 100 | 160 | 200 | 80 | 85 |
| (2) Results of evaluation | | | | | | | | |
| Impact strength (kg-cm) | 105 | 72 | 78 | 87 | 97 | 98 | 78 | 76 |
| Oxygen permeability (cc/m2-day-atm) | 12 | 3.8 | 9.2 | 9.7 | 7.0 | 6.9 | 7.0 | 9.0 |
| Transparency | | | | | | | | |
| Before boiling | 2.2 | 6.4 | 3.2 | 3.5 | 3.9 | 3.9 | 3.5 | 5.6 |
| After boiling | 4.8 | 9.1 | 5.7 | 5.0 | 6.7 | 6.2 | 5.2 | 11.2 |

| | Comparative Example | | | | | |
|---|---|---|---|---|---|---|
| | 1 | 2 | 3 | 4 | 5 | 6 |
| (1) Multi-layer film | | | | | | |
| Blending weight ratio in layer B: N-MXD6/N-6 | 80/20 | 80/20 | 80/20 | 30/70 | 100/0 | 80/20 |
| Melt viscosity ratio R | 0.8 | 0.8 | 0.8 | 0.8 | — | 0.4 |
| log R | −0.1 | −0.1 | −0.1 | −0.1 | — | −0.4 |
| (measured temp. for R in °C.) | (260) | (260) | (260) | (260) | | (260) |
| log R | | | | | | |
| Upper limit | 1.5 | 1.5 | 1.5 | 0.3 | — | 1.5 |
| Lower limit | −0.2 | −0.2 | −0.2 | −1.5 | — | −0.2 |
| Thicknesses of layers (μm) | | | | | | |
| Layer A/layer B | 10/4 | 10/60 | 4/16 | 10/17 | 10/10 | 10/19 |
| Thicknesses of layers (μm) | | | | | | |
| Layer C/layer D | 10/55 | 10/40 | 10/50 | 10/60 | 10/50 | 10/56 |
| Overall thickness (μm) | 79 | 120 | 80 | 100 | 80 | 95 |
| (2) Results of evaluation | | | | | | |
| Impact strength (kg-cm) | 95 | 24 | 21 | 88 | 95 | 81 |
| Oxygen permeability (cc/m2-day-atm) | 32 | 2.6 | 9.9 | 30 | 9.2 | 8.7 |
| Transparency | | | | | | |
| Before boiling | 1.6 | 9.0 | 3.2 | 3.0 | 3.9 | 5.7 |
| After boiling | 2.9 | 12.1 | 5.8 | 4.4 | 32.1 | 23.1 |

COMPARATIVE EXAMPLE 7

Nylon 6 (used for the construction of a layer A, manufactured by Ube Industries, Inc. under the trade name of Ube Nylon 1030B, and hereinafter sometimes referred to as N-6), a blend (used for the construction of a layer B) of nylon MXD6 (manufactured by Mitsubishi Gas Chemical Co., Inc. under the trade name of MX nylon 6121) with N-6 and an extruder having a cylinder diameter of 45 mm, respectively, to bring them into a multi-layer melted state through a feed block so that the order of the arrangement of the layers might be (A)/(B)/(C)/(D) and they were formed into a multi-layer film by the T-die/cooling roll method (co-extrusion method). In the formation of the multi-layer film, the fluidity of the barrier layer was unstable and hence the thickness of each layer was uneven. Therefore, a sample for the evaluation cannot be obtained.

COMPARATIVE EXAMPLE 8

Using the same apparatus and method as in Example 1, a multi-layer film having the same layer arrangement as in Example 1 was produced by the co-extrusion method, except that the thickness of the layer A (N-6 layer) was made to be 100 μm. The film was, however, poor in thermoformability when worked by a vacuum forming machine (model FKO-431-10 manufactured by Asano Laboratories, Inc.; the shape of the mold (container): tray) and a satisfactory container cannot be obtained as shown in Table 2 below.

TABLE 2

| Film | Film surface temperature during the vacuum forming (°C.) | Thermoformability |
|---|---|---|
| Example 1 | 105 | good (the bottom of the tray shaped satisfactorily) |
| Comparative Example 8 | 100 | poor (the bottom of the tray shaped unsatisfactorily) |
| | 105 | poor (the bottom of the tray shaped unsatisfactorily) |
| | 110 | poor (the bottom of the tray shaped unsatisfactorily) |
| | 115 | poor (the bottom of the tray shaped unsatisfactorily) |

The dimensions of the used mold (mm): 90 × 255 × 30

EXAMPLE 9

N-6 (manufactured by Ube Industries, Inc. under the trade name of Ube Nylon 1030B), a blend (for the construction of a layer B) of N-MXD6 (manufactured by Mitsubishi Gas Chemical Co., Inc. under the trade name of MX nylon 6121) with N-6 (manufactured by Ube Industries, Inc. under the trade name of Ube Nylon 1024B and having a semicrystallization time of 14 sec) with the blending weight ratio of N-MXD6/N-6 being 80/20 and the melt viscosity ratio R being 3.3, and a mixture (for the construction of a layer E) of an adhesive polyethylene (manufactured by Mitsui Petrochemical Industries, Ltd. under the trade name of ADMER NF300) with a straight-chain low-density polyethylene (manufactured by Mitsui Petrochemical Industries, Ltd. under the trade name of Ultzex 2022L) with the mixing weight ratio being 90/10 were extruded from an extruder having a cylinder diameter of 40 mm, an extruder having a diameter of 30 mm, and an extruder having a diameter of 40 mm, respectively, and were formed into a multi-layer film using a cylindrical multi-layer die by the inflation method (co-extrusion method) with the order of the layers being (A)/(B)/(E). The thickness of the layer A, the thickness of the layer B, and the thickness of the layer C were 30 μm, 10 μm, and 60 μm, respectively, and the overall thickness of the film was 100 μm. The impact strength of the film was 81 kg-cm, the oxygen permeability was 8.3 cc/m2-day-atm, and the transparency was 3.3 before boiling and 5.5 after boiling, which were on satisfactory levels.

What is claimed is:

1. A multilayer film comprising:

a layer (A) made of a polyamide (a) containing 70 to 100 mol % of structural units of the following formula:

the layer (A) having a thickness of 5 to 80 μm, a layer (B) made of a mixed polyamide ($b_3$) comprising (i) 60 to 95 weight % of a polyamide ($b_1$) obtained from a diamine comprising 70 mol % or more of meta-xylylenediamine and a dicarboxylic acid comprising 70 mol % or more of an α,ω-aliphatic dicarboxylic acid having 6 to 12 carbon atoms and (ii) 40 to 5% by weight of an aliphatic polyamide ($b_2$) having a semicrystallization time of 30 seconds or less at 160° C. and a solubility parameter (SP value) of 13±1.5, said mixed polyamide ($b_3$) satisfies the following relationship:

$$(0.025C-2.2) \leq \log R \leq (0.025C-0.5),$$

wherein C represents the % by weight of the polyamide ($b_1$) in the mixed polyamide ($b_3$) and R represents a ratio $\eta(b_1)/\eta(b_2)$ in which $\eta(b_1)$ and $\eta(b_2)$ denote the melt viscosity of the polyamide ($b_1$) and the melt viscosity of the polyamide ($b_2$), respectively, at a temperature at least 20° C. higher than the higher melting point of the melting points of the polyamide ($b_1$) and the aliphatic polyamide ($b_2$), the layer (B) having a thickness of 5 to 50 μm, a layer (C) made of an adhesive polyolefin ($c_1$) or a mixed resin ($c_3$) comprising the adhesive polyolefin ($c_1$) and a polyolefin ($c_2$), and a layer (D) made of a polyolefin (d), wherein the layers are disposed in the following order: the layer (A)/the layer (B)/the layer (C)/the layer (D), and the thickness of the multi-layer film being 15 μm or more.

2. The multi-layer film as claimed in claim 1, wherein the polyamide ($b_1$) is obtained from meta-xylylenediamine and adipic acid.

3. The multi-layer film as claimed in claim 1, which is formed by co-extrusion or extrusion coating.

4. A multilayer film comprising:

a layer (A) made of a polyamide (a) containing 70 to 100 mol % of structural units of the following formula:

the layer (A) having a thickness of 5 to 80 μm, a layer (B) made of a mixed polyamide ($b_3$) comprising (i) 60 to 95 weight % of a polyamide ($b_1$) obtained from a diamine comprising 70 mol % or more of meta-xylylenediamine and a dicarboxylic acid comprising 70 mol % or more of an α,ω-aliphatic dicarboxylic acid having 6 to 12 carbon atoms and (ii) 40 to 5% by weight of an aliphatic polyamide ($b_2$) having a semicrystallization time of 30 seconds or less at 160° C. and a solubility parameter (SP value) of 13±1.5, said mixed polyamide ($b_3$) satisfies the following relationship:

$$(0.025C-2.2) \leq \log R \leq (0.025C-0.5),$$

wherein C represents the % by weight of the polyamide ($b_1$) in the mixed polyamide ($b_3$) and R represents a ratio $\eta(b_1)/\eta(b_2)$ in which $\eta(b_1)$ and $\eta(b_2)$ denote the melt viscosity of the polyamide ($b_1$) and the melt viscosity of the polyamide ($b_2$), respectively, at a temperature at least 20° C. higher than the higher melting point of the melting points of the polyamide ($b_1$) and the aliphatic polyamide ($b_2$), the layer (B) having a thickness of 5 to 50 $\mu$m, and a layer (E) made of an adhesive polyolefin ($e_1$) or a mixed resin ($e_3$) comprising the adhesive polyolef in ($e_1$) and a polyolefin ($e_2$), wherein the layers are disposed in the following order: the layer (A)/the layer (B)/the layer (E), and the thickness of the multi-layer film being 15 $\mu$m or more.

5. The multi-layer film as claimed in claim 4, which is the polyamide ($b_1$) is obtained from meta-xylylenediamine and adipic acid.

* * * * *